United States Patent [19]

Comans et al.

[11] Patent Number: 4,728,582

[45] Date of Patent: Mar. 1, 1988

[54] CERAMIC SLIDING ELEMENT WITH ALUMINUM OXIDE AND SILICON NITRIDE MEMBERS

[75] Inventors: Hans-Jurgen Comans, Krefeld-Fisheln; Ulrich Krohn, Leonberg; Hans Jud, Esslingen; Hans-Gerd Rittel, Wendlingen, all of Fed. Rep. of Germany

[73] Assignee: Feldmuehle Aktiengesellschaft, Dusseldorf II, Fed. Rep. of Germany

[21] Appl. No.: 893,337

[22] Filed: Aug. 5, 1986

[30] Foreign Application Priority Data

Aug. 13, 1985 [DE] Fed. Rep. of Germany ........ 3528934

[51] Int. Cl.[4] .......................... F16C 33/24; C23C 7/00
[52] U.S. Cl. ...................................... 428/698; 428/36; 428/701; 428/699
[58] Field of Search ............... 428/689, 698, 699, 701, 428/35, 36

[56] References Cited

U.S. PATENT DOCUMENTS

| 4,419,971 | 12/1983 | Nakamura et al. ............. 428/698 X |
| 4,420,142 | 12/1983 | Dworak et al. ..................... 251/368 |

FOREIGN PATENT DOCUMENTS

| 0118056 | 12/1984 | European Pat. Off. . |
| 0178169 | 4/1986 | European Pat. Off. . |
| 1282377 | 11/1968 | Fed. Rep. of Germany . |
| 1291957 | 4/1969 | Fed. Rep. of Germany . |
| 2834146 | 3/1978 | Fed. Rep. of Germany . |
| 3427456 | 1/1986 | Fed. Rep. of Germany ...... 428/699 |
| 1454755 | 11/1965 | France . |
| 67746 | 4/1978 | Italy . |
| 0111922 | 6/1984 | Japan ................................... 428/698 |
| 1087870 | 5/1986 | Japan ................................... 428/689 |
| 991421 | 5/1965 | United Kingdom ................ 428/698 |
| 1434365 | 5/1976 | United Kingdom . |

OTHER PUBLICATIONS

"Progress in Nitrogen Ceramics", 1983, pp. 683 to 694.
Japanese Patent Abstract 58-160625, 59-34020, 59-50223.
English Translation of Japanese A-59-47523.
Abstract of Japanese 77/51,283, Chemical Abstracts, vol. 90, 1979, p. 230.
Refractories, Ceramics p. 23 (Kawasaki Steel), J53137-214.

*Primary Examiner*—Nancy A. B. Swisher
*Attorney, Agent, or Firm*—Felfe & Lynch

[57] ABSTRACT

In a sliding element having first and second members in friction and/or sealing contact, the first member s made by sintering a ceramic mixture based on silicon nitride, the content of the silicon nitride phase and/or of the silicon nitride mixed crystal phase being at least 60 weight-percent and the second counter-element member being formed of a ceramic material based on aluminum oxide.

10 Claims, No Drawings

CERAMIC SLIDING ELEMENT WITH ALUMINUM OXIDE AND SILICON NITRIDE MEMBERS

BACKGROUND OF THE INVENTION

The present invention relates to a sliding or engaging element having at least two members. The elements are useful for example as sealing or bearing members. The mating or pairing of such sliding or friction members is known, especially in the form of axial friction ring seals or packing rings for armatures. The present invention requires that one of the members be formed of aluminum oxide and the other of silicon nitride, to give excellent wear and low friction high sealing characteristic.

GB-A No. 14 34 365 describes friction ring seals in which one of the two engaged members has a coating of boron carbide. This patent refers, for comparison, to sliding friction members made from hot-pressed silicon nitride in engagement with a counter-element of carbon. The silicon nitride/carbon combination of the "prior art" was evidently not considered to be particularly suitable.

EP-A- No. 0 118 056 describes the use of aluminum oxide and silicon nitride for the production of sealing components in a friction bearing, graphite being described as the material of the counter-element members.

Friction members of silicon nitride are also described in Japanese patent applications No. 50 223, 34 020 and 16 0625, where they are described as being in engagement with counter-element members not further specified.

In the Dutch book, "Progress in Nitrogen Ceramics," 1983, pp 683 to 693, a sliding friction element pairing is also described in which both element members consist of sialon (silicon aluminum oxynitride).

In addition, a number of materials have been proposed for the seal plates of single-lever mixing faucets.

In the past, seal plates for single-lever mixing faucets were usually of aluminum oxide, sometimes mixed with, for example, zirconium oxide. Older publications, including, for example, DE-B No. 12 82 377; FR-A No. 14 54 755; DE-B No. 12 91 957; DE-A No. 28 34 146, relate to sliding friction element members and counter-element members of materials based on aluminum oxide. These proposals have certain disadvantages; in particular the known sliding friction element pairs have the disadvantage of excessively great static friction.

A more recent proposal by the applicant, however, provides in EPB No. 43 456 for a special mixture of ceramic material components for the achievement of an especially low percentage of areas in contact.

Although this proposal for the first time overcomes the prejudice that has heretofore existed that useful sealing action can be achieved only with a high percentage of areas in contact, it also contains certain practical disadvantages with respect to production. These disadvantages arise from the fact that, due to the extreme fineness of the starting ceramic powders, in many cases the high power consumption causes the production costs to exceed economically acceptable levels for some uses. In more recent and not yet published patent applications, a surface treatment by etching or coating is proposed by the applicant to obtain sliding friction elements of lower friction coefficients. These methods, although leading to very good results with regard to sliding friction elements which have lower static friction, and also have an excellent sealing action, are also costly, so that the sliding friction elements made by these methods are not always practical. In Italian patent application No. 67 746-A/82, a sliding friction element has been proposed using members of hard materials having different properties, at least one of the plates consisting of silicon carbide.

One of the disadvantages of these proposals is that the proposed combination uses sliding friction element members of greater hardness or less smooth surface. The advantage is that the areas of contact between the two cooperating sliding friction elements will be reduced lowering friction therebetween. However to accomplish this entails relatively high costs due to the use of silicon carbide, and as a result of the different hardnesses of the sliding friction member, the harder sliding member acts almost as a surface-machining tool for the other, less hard sliding member, resulting in an undesirable alteration of the surface of the less hard sliding member.

Furthermore, in the case of a pairing of sliding member, e.g., a sealing disk pairing for a sanitary single-lever mixing faucet in which the one sealing disk consists of silicon carbide, and one sealing disk has a more complex geometry, the sealing disk with the more complex shape cannot be made from silicon carbide but must be made of aluminum oxide, for example. This is due to the known problems involved in the production of silicon carbide components. Furthermore, the sealing disk, which is especially subject to thermal shock, cannot be made from silicon carbide due to the more complicated shape of the sealing disk.

The existing disadvantages of silicon carbide are explained by the insufficient toughness of this relatively brittle material, so that chipping of components made from silicon carbide often occurs during manufacture, especially when they are made in more complex shape and are impacted during manufacture, e.g., when sandblasted, and when they are transported as bulk goods.

Lastly, DE-U No. 80 12 995 calls for silicon carbide or silicon nitride for the manufacture of different components in a wear-resistant armature for flowing substances. This document does not contain any proposal for the selection of the other elements in contact with the elements of silicon carbide and silicon nitride.

With respect to the known state of the art, the present invention has been directed to the problem of developing a sliding element whose paired or engaged members can be manufactured from ceramic materials known in themselves, without the need for expensive surface treatment processes. The sliding friction element members are to have a good sealing action and at the same time have low static friction coefficient in comparison to the known, uncoated ceramic elements made, for example, of aluminum oxide.

BRIEF DESCRIPTION

The solution of the problem in question is accomplished by a sliding element having a first sliding member with contact or sealing surfaces of ceramic material having a silicon nitride phase and/or silicon nitride mixed crystal phase of at least 60 weight % and a second counter-element member having its contact or sealing surfaces formed of aluminum oxide ceramic. Silicon nitride materials have long been known for the production of sliding members, but heretofore they have never been combined with counter-element members of aluminum oxide. The suitability of the sliding friction element pairing proposed according to the invention is to be considered as surprising, inasmuch as both the sliding friction element member of silicon nitride and the counter-element member of aluminum oxide have a high percentage of areas in contact. Based on established technical assumptions high coefficients of friction were to be expected. It is not yet clearly understood why the invention results in low friction coefficients in static and dynamic friction. It can, however, be assumed that, due to the high content of covalent bonds in the sliding element of silicon nitride material, few free electrons are available in orbits protruding slightly above the surface of the sliding element, and thus there is very little tendency to form physical or chemical bonds with the counter-element member.

In addition, the high resistance to wear that has been found for the present invention is totally unexpected in view of the art. The combinations shown in the art, of silicon nitride materials, e.g., as axial friction ring seals, describe counter-element members of a great number of different materials. These counter-element members were, for example, metal or carbon materials, which in turn were proposed for combination with elements of aluminum oxide. These combinations never met with complete success in many applications.

DESCRIPTION OF THE PREFERRED EMBODIMENT

By silicon nitride ceramic material or material based on silicon nitride, in which the percentage of silicon nitride crystals and/or silicon nitride mixed crystals is at least 60% by weight, there is intended to be included all silicon nitride materials containing crystal phases in this numerical range. Mixed crystals are to be understood to be those in which silicon atoms are replaced by aluminum atoms and nitrogen atoms by oxygen atoms. According to the invention, those sliding element members are especially preferred which consist of materials with a content of at least 80 wt.-% of silicon nitride phase. Furthermore, sliding members are preferred which have a content of at least 80% silicon aluminum oxynitride by weight. According to another preferred embodiment, the silicon nitride phase lies in the alpha or beta phase, and the silicon nitride mixed crystal phase lies in the beta' mixed crystal phase. The beta and beta' phases are especially preferred. The rest of the material can consist of a glass phase composed, for example, of silicon dioxide and yttrium compounds of a crystal structure different from that of silicon nitride.

By aluminum oxide ceramic material or material based on aluminum oxide, it is meant to include materials which contain, in addition to aluminum oxide, other oxides such as magnesium oxide and the like as sintering aids, and also those aluminum oxides which contain a defined percentage of zirconium oxide to improve their strength and which have become known by the name, "dispersion ceramics." The impurities usual in the art, which unavoidably get into the material with the grinding detritus, are allowed in small amounts within the present invention. Preferably, however, the content of such impurities, which include, for example, iron, tungsten, aluminum, zirconium, cerium, carbon and oxygen, will not exceed 3% by weight.

According to an especially preferred embodiment, the sliding member of the paired element is formed of: 4 to 15 wt.-% of yttrium oxide, which can be replaced wholly or partially by 1 to 5 wt.-% of magnesium oxide, 0 to 10 wt.-% of silicon dioxide, 0 to 10 wt.-% of aluminum oxide, and 0 to 4 wt.-% of iron oxide, balance silicon nitride, all weight parts together making 100%.

According to preferred embodiments, the sliding elements consist of articles made by pressure-less sintering or by reaction sintering of a shaped powder mixture. Thus the friction elements can be given complex geometries permitting configurations of lesser thickness, which in the case of sealing disks of a sanitary single-lever mixing faucet permits the production of smaller armatures. To achieve an especially high density and low porosity and thus also greater strength, the sintering process can be followed by a hot isostatic pressing process.

The use of the sliding friction element pairing according to the invention is possible in many areas of technology; especially preferred is its use as a sealing disk in a single-lever mixing faucet or as a friction ring in a friction ring seal. If design considerations require a more complex configuration either of the sliding member or of the counter-element member, the member having the more complex shape is to be made preferably from the material based on silicon nitride in accordance with the invention. This achieves the advantage that the element formed from silicon nitride gives the pairing an especially great utility value.

The known methods and apparatus of the ceramic industry serve for the production of the sliding friction elements according to the invention.

For planar surfaces, the sintering under inert gas is followed by an ordinary mechanical grinding, lapping or polishing process to create the required planar surfaces.

According to the invention when the friction element of silicon nitride is used in a sanitary single-lever mixing faucet, an additional advantage results from the fact that the plastic inserts commonly used in the design of the single-lever faucets to cushion the force applied to the valve sealing disk can be eliminated. This is surprising also in that, based on a comparison of the strength of silicon nitride for example with aluminum oxide ceramic, it could not be expected that the usual use of plastic inserts could be dispensed with.

EXAMPLE

A powder mixture consisting of:
  6 weight-parts yttrium oxide
  3 weight-parts silicon dioxide
  2.5 weight-parts aluminum oxide,
  balance silicon nitride is thoroughly ground all the way to the submicron range and made uniform in shape, pressed in the form of a common valve sealing disk, and sintered without pressure. The compacting pressure amounted to 1500 bar, and the sintering was performed in a nitrogen atmosphere at a temperature of 1750° C. for one hour. The sealing disk obtained was ground and polished to a planarity of 2 light bands and a contact surface area percentage of 80%.

The average grain size in the finished sealing disk amounts to 2 microns.

To determine the friction, a sliding friction element in the form of a pin-like test body was made of the material according to the example, its surface was ground and polished, and the sample was tested on the friction test stand against a test body consisting of aluminum oxide and made in the form of a sealing disk. For comparison, test articles of similar construction with ground and polished surfaces were tested against one another. The sliding friction and static friction coefficients obtained are set forth in the following table:

TABLE

| Test body Pair in sliding contact | Lubrication | Sliding friction coefficient μ | Static friction coefficient μ |
|---|---|---|---|
| Silicon nitride from Example 1 on aluminum oxide | dry | 0.095 | 0.125 |
|  | oiled | 0.05 | 0.1 |
| Aluminum oxide on aluminum oxide | dry | 0.22 | 0.34 |
|  | oiled | 0.13 | 0.19 |

The table shows a decided superiority in the case of the pairing of a test body according to the invention with an aluminum oxide sealing disk, in comparison with the all-aluminum oxide pairing, especially in the case of the especially important static friction coefficient without lubrication. This datum is a measure of the force required in order to break loose after standing.

It will be understood that the specification and examples are illustrative but not limitative of the present invention and that other embodiments within the spirit and scope of the invention will suggest themselves to those skilled in the art.

What is claimed is:

1. In a sliding element of the type comprising first and second counter-element members in friction contact and/or sealing contact with each other the improvement comprising forming said first member of a silicon nitride based ceramic material having a content of silicon nitride phase and/or of silicon nitride mixed crystal phase of at least 60 wt.-%, and forming said counter-element second member of an aluminum oxide based ceramic material.

2. The sliding element of claim 1 wherein said first member slides against said counter-element second member.

3. The sliding element of claim 1, wherein said first member has a content of the silicon nitride phase and/or silicon nitride mixed crystal phase of at least 80 wt.-%.

4. The sliding element of claim 1 wherein the silicon nitride phase is in the alpha or beta phase and the silicon nitride mixed crystal phase is in the beta' phase.

5. The sliding element of claim 1 wherein said silicon nitride ceramic material consists essentially of:
   4.0 to 15 wt.-% yttrium oxide, which can be replaced entirely or in part by 1 to 5 wt.-% of MgO,
   0 to 10 wt.-% silicon dioxide
   0 to 10 wt.-% aluminum oxide
   0 to 4 wt.-% iron oxide
   balance silicon nitride to make up 100 wt.-%.

6. The sliding element of claim 1 wherein said first member is a solid body made by pressure-less sintering of a shaped and precompacted powder mixture.

7. The sliding element of claim 1 wherein said first member is a solid body made by reaction sintering of a shaped powder mixture.

8. The sliding element of claim 1 wherein after sintering said first member is recompressed by hot isostatic pressing.

9. The sliding element of claim 1 characterized in that the first member and second counter-element member are elements of an axial friction ring seal.

10. The sliding element of claim 1 characterized in that the first member and second counter-element member are elements shaped as discs of a valve.

* * * * *